United States Patent
Hargrave et al.

(10) Patent No.: US 9,528,241 B2
(45) Date of Patent: Dec. 27, 2016

(54) BARRIER PANEL INTERLOCK SEALING SYSTEM AND METHOD

(71) Applicant: CMI LIMITED CO., Marietta, GA (US)

(72) Inventors: Steve Hargrave, Roswell, GA (US); John Irvine, Atlanta, GA (US); Charles Brown, Atlanta, GA (US); Anthony Parise, Decatur, GA (US)

(73) Assignee: CMI LIMITED CO., Marietta, GA (US)

( * ) Notice: Subject to any disclaimer, the term of this patent is extended or adjusted under 35 U.S.C. 154(b) by 0 days.

(21) Appl. No.: 14/918,842

(22) Filed: Oct. 21, 2015

(65) Prior Publication Data

US 2016/0115666 A1    Apr. 28, 2016

Related U.S. Application Data

(60) Provisional application No. 62/068,065, filed on Oct. 24, 2014.

(51) Int. Cl.
| | |
|---|---|
| *E02D 5/14* | (2006.01) |
| *F16J 15/10* | (2006.01) |
| *F16J 15/02* | (2006.01) |
| *F16J 15/06* | (2006.01) |
| *F16J 15/14* | (2006.01) |

(52) U.S. Cl.
CPC ............... *E02D 5/14* (2013.01); *F16J 15/022* (2013.01); *F16J 15/027* (2013.01); *F16J 15/068* (2013.01); *F16J 15/104* (2013.01); *F16J 15/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 824,513 | A | * | 6/1906 | Stevens ..................... E02D 5/08 405/14 |
| 1,937,758 | A | * | 12/1933 | Harris ....................... E02D 5/08 405/279 |
| 3,302,412 | A | | 2/1967 | Hunsucker |
| 3,822,557 | A | | 7/1974 | Frederick |
| 4,296,933 | A | * | 10/1981 | Tolliver .................. F16L 17/10 277/605 |
| 4,484,835 | A | | 11/1984 | Van Klinken |
| 4,664,560 | A | | 5/1987 | Cortlever |
| 5,106,233 | A | | 4/1992 | Breaux |
| 5,118,230 | A | | 6/1992 | Justice |
| 5,163,785 | A | | 11/1992 | Zanelli et al. |
| 5,290,045 | A | * | 3/1994 | Terauchi ................... E03F 3/04 277/312 |
| 5,320,454 | A | | 6/1994 | Walling |
| 5,354,149 | A | | 10/1994 | Breaux |
| 5,360,293 | A | | 11/1994 | Breaux et al. |
| 5,435,666 | A | | 7/1995 | Hassett et al. |

(Continued)

*Primary Examiner* — Kyle Armstrong
(74) *Attorney, Agent, or Firm* — Gardner Groff Greenwald & Villanueva, PC

(57) ABSTRACT

A system, method and sealing components for resisting fluid transmission through an interlock joint between first and second sheet piling panels of a barrier assembly. A compressible sealing member is engaged between interlock members of the sheet piling panels as the barrier assembly is constructed. A dispersible sealant is optionally dispersed into the interlock joint upon compression of the sealing member.

20 Claims, 5 Drawing Sheets

(56) References Cited

U.S. PATENT DOCUMENTS

| | | | |
|---|---|---|---|
| 5,437,520 A | 8/1995 | Cherry et al. | |
| 5,497,097 A * | 3/1996 | Walling | H01R 13/641 |
| | | | 324/538 |
| 5,520,487 A | 5/1996 | Decker | |
| 5,547,318 A | 8/1996 | Decker | |
| 5,551,808 A | 9/1996 | Sandanasamy et al. | |
| 5,584,601 A | 12/1996 | Hahn et al. | |
| 5,584,610 A | 12/1996 | Simpson et al. | |
| 5,921,716 A | 7/1999 | Wickberg et al. | |
| 5,938,375 A | 8/1999 | Wheeler, Jr. et al. | |
| 5,957,625 A | 9/1999 | Vales | |
| 6,053,666 A | 4/2000 | Irvine et al. | |
| 6,103,334 A | 8/2000 | Gruber, Sr. | |
| 6,328,310 B1 * | 12/2001 | Chikaraishi | F16J 15/068 |
| | | | 277/314 |
| 6,758,634 B2 | 7/2004 | Nickelson et al. | |
| 2014/0003870 A1 * | 1/2014 | Wendt | E02D 5/06 |
| | | | 405/285 |
| 2014/0062038 A1 * | 3/2014 | Wolf | F16J 15/025 |
| | | | 277/648 |

\* cited by examiner

BARRIER PANEL INTERLOCK SEALING SYSTEM AND METHOD

CROSS-REFERENCE TO RELATED APPLICATIONS

This application claims the benefit of U.S. Provisional Patent Application Ser. No. 62/068,065 filed Oct. 24, 2014, the entirety of which is hereby incorporated herein by reference for all purposes.

TECHNICAL FIELD

The present invention relates generally to barrier panels such as sheet pilings used to form barriers and other structures such as cut-off containment barrier walls, sea walls, piers, barrier walls, retaining walls and the like. More particularly, the invention relates to systems, methods and associated components and materials for providing improved sealing between adjacent panels within a structure to prevent or resist fluid migration.

BACKGROUND

Structural panels such as sheet pilings are used to construct barriers and other structures. U.S. Pat. No. 7,025,539, which is incorporated herein by reference, for example, shows a form of sheet pile used to create a barrier wall. It has been discovered that in some applications such as cut-off containment barrier walls for example, improved sealing to prevent fluid migration between adjacent panels within a structure would be advantageous.

It is to the provision of improved systems, methods and associated components and materials for sealing to prevent fluid migration between adjacent panels within a structure, for example a sheet piling wall structure, to prevent or resist fluid migration, that the present invention is primarily directed.

SUMMARY

In example embodiments, the present invention provides a system, method and sealing components for resisting fluid transmission through an interlock joint between first and second sheet piling panels of a barrier assembly. A compressible sealing member is engaged between interlock members of the sheet piling panels as the barrier assembly is constructed. A dispersible sealant is optionally dispersed into the interlock joint upon compression of the sealing member. Various sealing member configurations optionally provide for sealing contact upon compression or flexure of the sealing member, for controlled containment and release of a dispersible sealant, and/or for spring-like bias between interlock elements of the sheet piling panels for improved sealing contact between interlock surfaces.

In one aspect, the present invention relates to a sheet piling panel for forming a barrier assembly. The sheet piling panel preferably includes first and second interlock profiles, and a resilient sealing member extending along at least a portion of one of the first and second interlock profiles.

Optionally, the sealing member comprises a dispersible fluid sealant therein, which is dispersed upon engagement of the interlock profiles of adjacent sheet piling panels upon assembly of a wall structure to provide an improved seal against liquid transmission between the panels. The sealant is optionally pre-loaded into the sealing member at the manufacturing site, and contained in the sealing member in a waterproof and/or airtight manner to prevent water contact or premature curing during transport and storage. Alternatively, the sealant may be loaded into the sealing member after manufacture, for example at the installation side.

In another aspect, the invention relates to a sealing member for sheet piling panels, the sealing member preferably including a base portion for attachment to the sheet piling panel and a generally resilient body projecting outwardly from the base portion.

In still another aspect, the invention relates to a barrier assembly including a first sheet piling panel comprising a female interlock, a second sheet piling panel comprising a male interlock, and a resilient sealing member engaged between the female interlock of the first sheet piling panel and the male interlock of the second sheet piling panel.

In another aspect, the invention relates to a method of sealing against fluid transmission through an interlock joint between first and second sheet piling panels of a barrier assembly. The method preferably includes engaging a resilient sealing member between a female interlock of the first sheet piling panel and a male interlock of the second sheet piling panel.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 2:
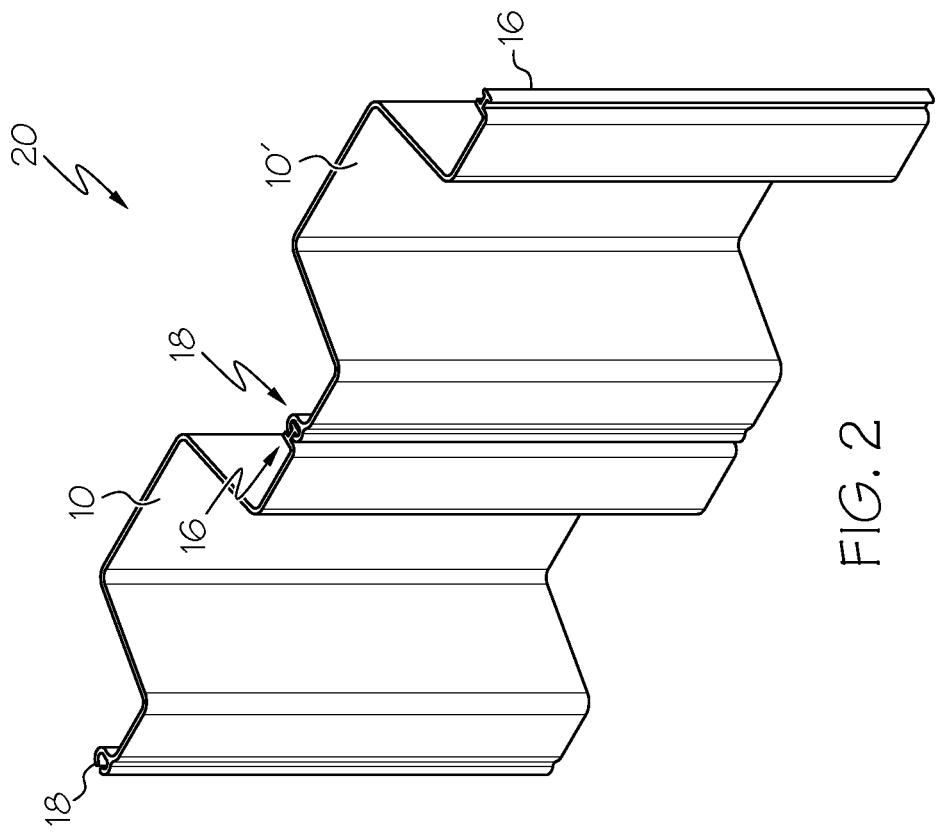
FIG. 2 is a perspective view of an example form of a barrier formed of sheet piling panels, to which the sealing system of the present invention can be applied.
Figure 1:
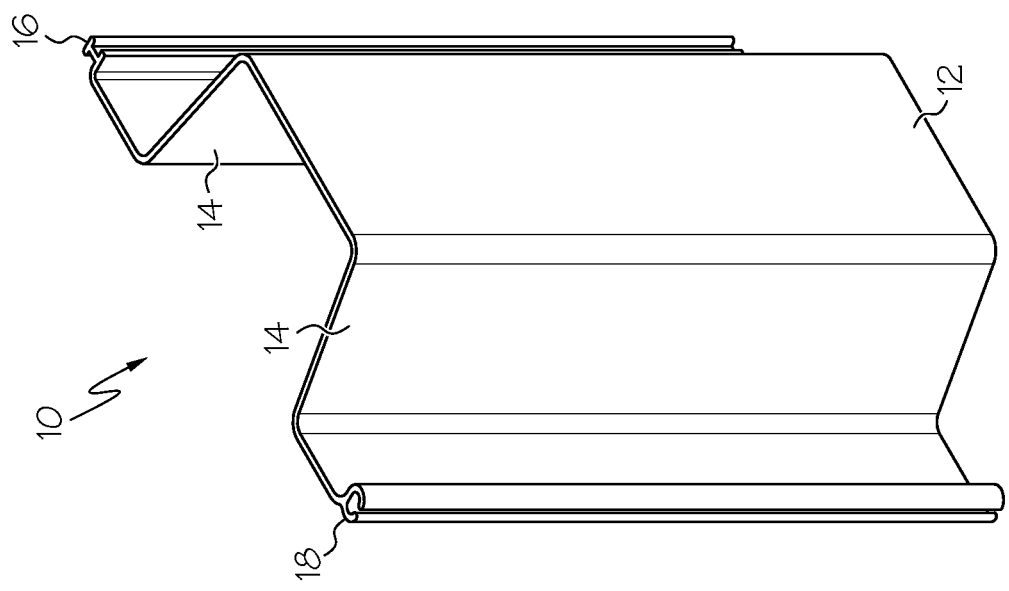
FIG. 1 is a perspective view of a sheet piling panel according to an example form, to which the sealing system of the present invention can be applied.
Figure 3A:
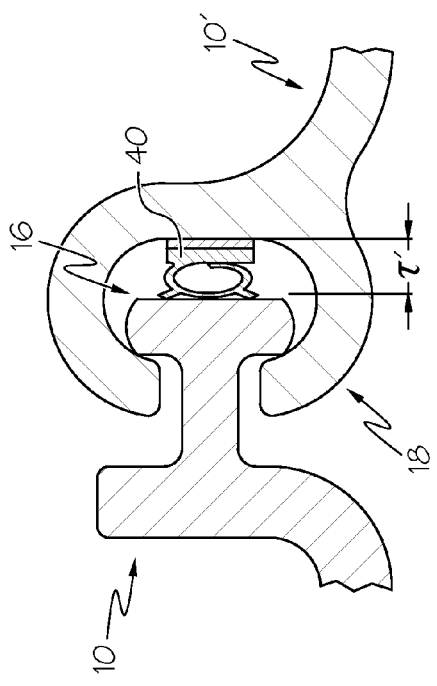
FIGS. 3A-3D show detailed cross-sectional views of the lock profile of a sheet piling panel incorporating example embodiments of the sealing system of the present invention.
Figure 3B:
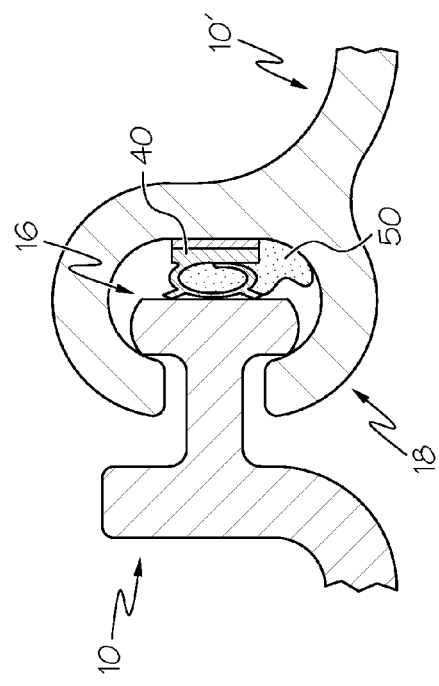
Figure 3C:
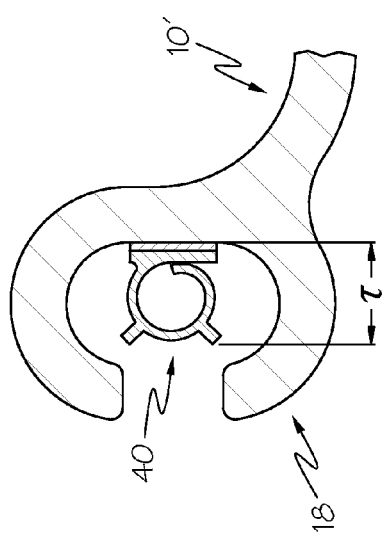
Figure 3D:
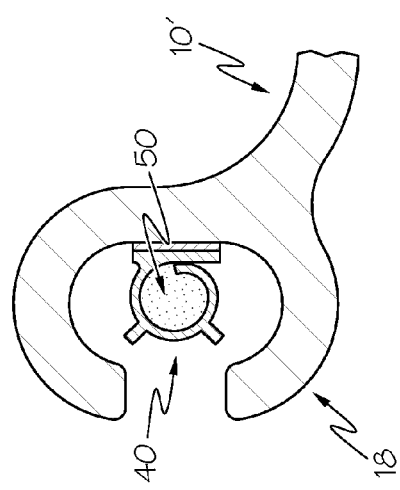

With reference now to the drawing figures, wherein like reference numbers represent corresponding parts throughout the several views, FIGS. 1 and 2 show sections of sheet piling panels 10, and an assembly or structure 20 comprising a plurality of interlocked sheet piling panels. In the depicted embodiments, the sheet piling panel 10 comprises a channel shaped cross-sectional profile having a front panel 12, a pair of rearwardly extending side panels 14, and first and second back panels with a male interlock 16 and a female interlock 18 respectively at distal ends thereof. In alternate embodiments, the sheet piling panel can comprise various cross-sectional profiles, such as a C-shaped or U-shaped channel, a corrugated S-shaped or Z-shaped profile, a generally flat or planar cross-sectional profile, or other configuration.

As shown in FIG. 2, the male and female interlocks 16, 18 are generally complementary in shape, such that the male interlock 16 of one sheet piling panel 10 in an assembly 20 is interengagable with the female interlock 18 of an adjacent sheet piling panel 10' of the assembly. In the depicted embodiment, the female interlock channel 18 comprises an elongate C-shaped channel extending lengthwise along all or at least a portion of the length of the sheet piling 10, having a narrow slot along the distal edge thereof, and a wider internal void extending parallel and in communication the slot. The depicted embodiment of the male interlock flange 16 comprises a narrow web of material extending along all or at least a portion of the length of the sheet piling 10, and configured for axial sliding engagement through the slot of the female interlock channel; and a wider expanded rib configured for axial sliding engagement through the internal void of the female interlock channel. The rib of the male interlock 16 is sufficiently wider than the slot of the female interlock 18 to prevent lateral or transverse separation or "unzipping" of the male and female interlocks after they are engaged, thus providing positive attachment of adjacent sheet pilings 10 in an assembly 20.

The sheet piling panel 10 can be formed as an extrusion, by molding, or otherwise, of polyvinyl chloride (PVC), polypropylene, polyethylene, ABS, nylon, steel, aluminum, and/or other plastics, metals or other materials. The assembly or structure 20 may be configured as a cut-off containment barrier wall, a sea wall, pier, barrier wall, retaining wall, or other construction.

Figure 4B:
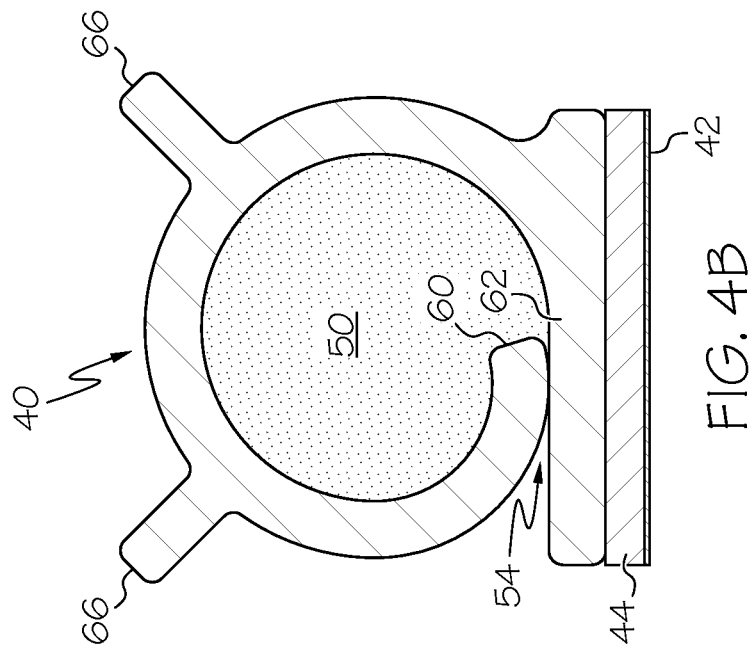
FIGS. 4A and 4B show detailed cross-sectional views of a seal component of the sheet piling sealing system, without and with a dispersible sealant material contained therein, according to example forms of the present invention.
Figure 4A:
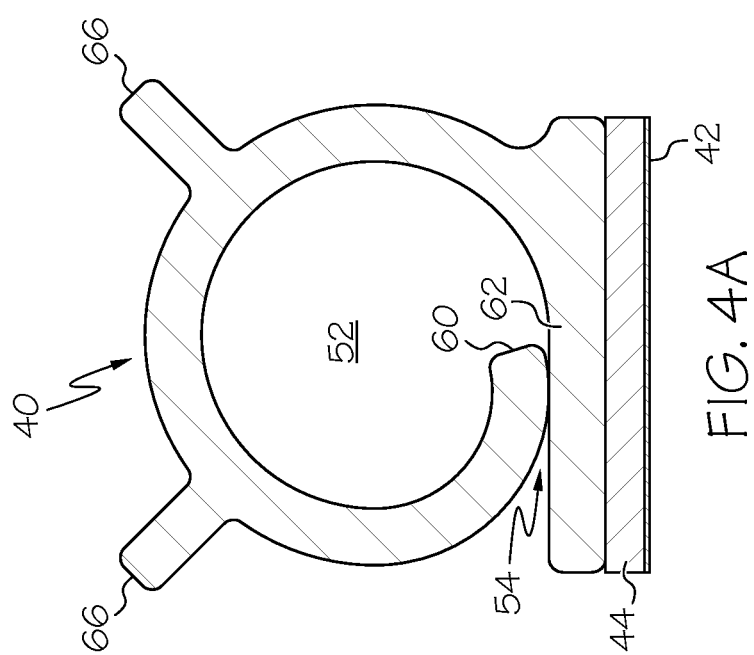
Figure 5A:
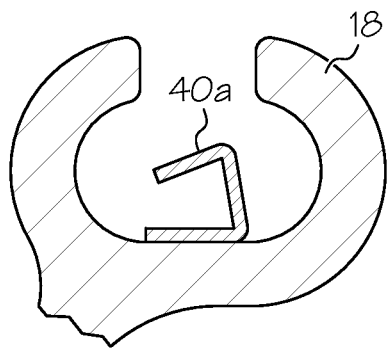
FIGS. 5A-5L show cross-sectional views of seal components according to alternate forms of the present invention.
Figure 5B:
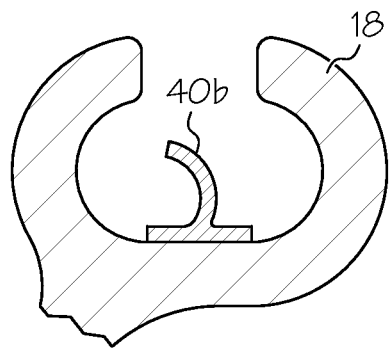
Figure 5C:
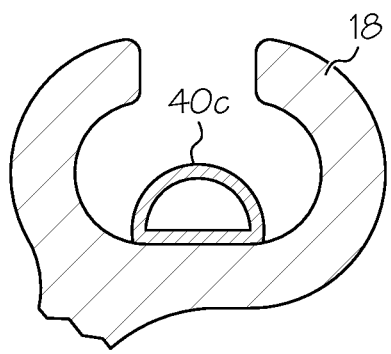
Figure 5D:
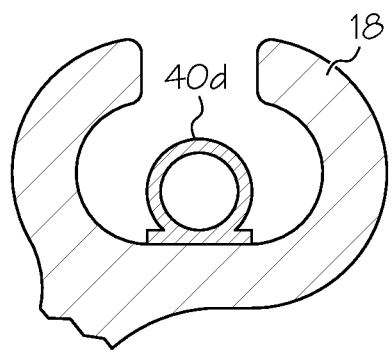
Figure 5E:
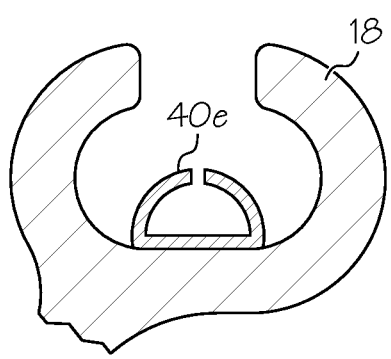
Figure 5F:
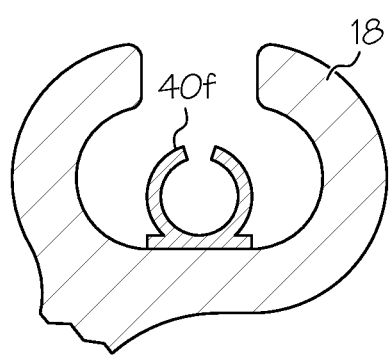
Figure 5G:
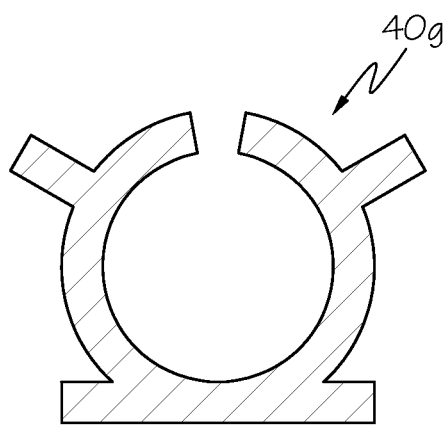
Figure 5H:
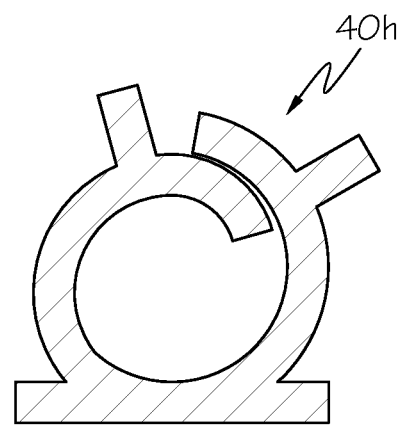
Figure 5I:
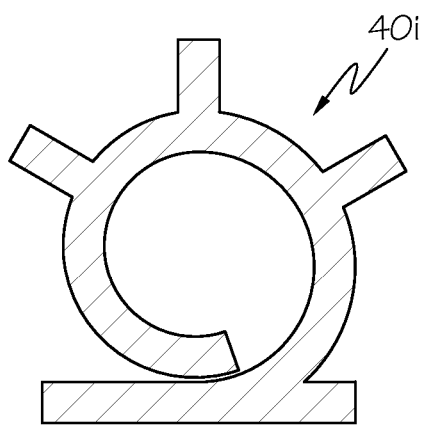
Figure 5J:
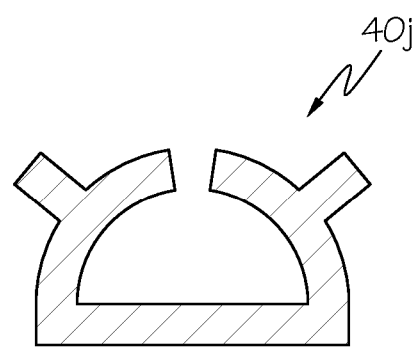
Figure 5K:
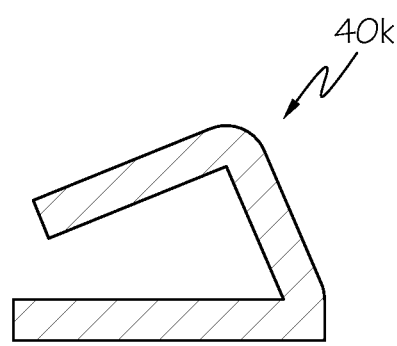
Figure 5L:
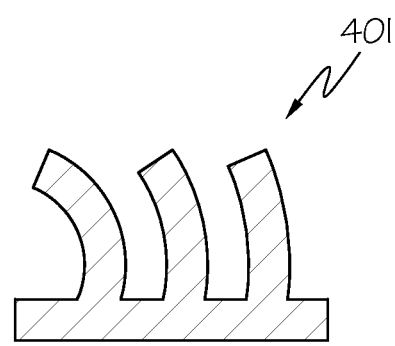

FIGS. 3-5 show various embodiments of a sealing system for preventing or resisting fluid migration through the joints formed between male and female interlocks 16, 18 of sheet pilings 10 in an assembly 20. For example, in seawall applications, the sealing system of the present invention prevents or resists leakage of water from the water side of the seawall through the interlock joints to the land side of the seawall. In barrier wall applications, the sealing system of the present invention may be utilized, for example, to prevent or resist groundwater leakage or migration across the barrier wall, and/or to prevent or resist transmission of contamination that may be present on one side of the barrier to a clean site on the opposite side of the barrier.

As shown in the example embodiments of FIGS. 3A-3E and FIGS. 4A and 4B, the sealing system may comprise an elongate flexible seal member 40 such as a tube or bulb extending generally coaxially or parallel along an internal portion of the female interlock channel 18, for example affixed to a back wall portion of the internal void of the female interlock channel opposite the slot of the female interlock. In alternate embodiments, the seal member can be affixed to the male interlock, or to both the male and female interlocks. The seal member 40 can be a separate component attached to the sheet piling 10 by adhesive 42 such as tape 44 or glue, by thermal welding or solvent bonding, by one or more fasteners, snaps, couplings or mating profile elements, or by other attachment means; or may be integrally formed with the sheet piling as by co-molding or other fabrication methods. In example embodiments, an adhesive specific to the PVC or other polymer of the sheet piling, and/or a very high bond (VHB) tape is utilized. The seal member 40 may comprise natural or synthetic rubber, plastic or other flexible and/or compressible material(s) of construction, such as for example flexible vinyl, Teflon, Viton, Buna-N, EPDM, nitrile, silicone, rubber, polyurethanes, polyolefins, thermoplastic elastomers, or other polymers or other materials. In example embodiments, the seal member 40 has a hardness of about 40-90 durometer, or in particular example embodiments about 60 durometer.

The seal member 40 is preferably resilient and/or compressible, and has an uncompressed thickness T (see FIGS. 3A and 3C) of a dimension greater than the open space or play between the male and female interlocks when engaged, such that engagement of the male and female interlocks compresses the seal member to a compressed thickness T' (see FIGS. 3B and 3D), and thereby forms a fluid or liquid impervious seal between the male and female interlocks. Additionally, as seen with reference to FIGS. 3B and 3D, the resilience of the seal member 40 acts as a spring, biasing one or more confronting surfaces of the male and female interlocks into abutment with one another, providing additional sealing against fluid or liquid passage through the panel interlocks of the barrier.

The seal member 40 optionally comprises a dispersible sealant 50 disposed within an internal chamber 52 or containment area in or on the seal member, and one or more passages or delivery ports 54 for dispersing the dispersible sealant 50 from the internal chamber 52 upon engagement of the male and female interlocks of adjacent sheet piling panels 10, 10' as the assembly is constructed. In the example embodiments depicted in FIGS. 3 and 4, the dispersible sealant 50 comprises a caulk or rope type sealant, and the seal member 40 comprises a split tubular bulb having a generally circular cross-sectional profile surrounding a hollow central chamber 52, defining a slit between a curled distal or free end 60 and a base portion 62 forming the delivery port 54 for dispersing the dispersible sealant. One or more resilient fins 66 (two are depicted) optionally extend lengthwise along the seal member 40, projecting distally outward and away from the base portion 62, for example obliquely at about a 45° angle relative to the base portion, from around the 10 o'clock and 2 o'clock positions of the generally circular cross-sectional profile of the seal member. The fins 66 form additional lines of sealing contact against the male interlock surfaces when engaged, and provide additional spring-like resilience to bias the male and female interlocks into sealing contact. In alternate embodiments, the seal member 40 is utilized without the provision of a dispersible sealant therein.

Optionally, the dispersible sealant 50 is a hydrophilic swellable material and/or otherwise expands upon contact with water or other liquid(s), to fill voids between surfaces of the male and female interlocks and further seal against leakage through the barrier assembly 20. In example embodiments, the dispersible sealant 50 is a multi-component system such as for example Adeka, Wadit, Deneef, or the like. Also optionally, the seal member 40 can be treated with or formed of chemically resistant materials such as for example Viton, Teflon, etc. to resist corrosion or damage from fluids or materials likely to be encountered in an intended application. A soil incursion reducer or plug is optionally provided at the bottom of the female interlock 18 of each sheet piling panel 10, to significantly reduce or prevent soil from entering the female interlock and potentially damaging the seal member 40 as the sheet piling panels are driven into the ground. Alternatively or additionally, a mandrel with a lock protecting plow or shield is utilized to protect the female interlock 18 as the sheet piling panel is driven into place with the mandrel.

In example methods of application, the sheet piling panels are installed by driving into the ground to a desired depth, for example using a mandrel as shown in U.S. Pat. No. 8,753,043, U.S. Pat. No. 8,419,317, U.S. Pat. No. 7,914,237, and/or U.S. Patent Pub. No. US2014/0270986 A1, which are incorporated herein by reference. Preferably, the sheet piling panels 10 are installed with their male interlock 16 trailing, and their female interlock 18 leading (from right to left in the embodiment of FIG. 2). In this manner, as a subsequent sheet piling panel 10 is driven into place with its male interlock 16 being received in the female interlock 18 of a previously installed sheet piling panel 10', engagement of the interlocks contacts and squeezes the seal member 40 to disperse the dispersible sealant 50 from the seal member. Any wiping off or axial displacement of the sealant 50 will thus be downward through the channel of the female interlock 18, spreading the sealant evenly along the interlock joint and pushing excess sealant toward the bottom of the barrier assembly 20 where its sealing effect is most likely needed.

FIGS. 5A-5L show various alternative embodiments, with compressible and/or resilient seal members 40a-40l of differing configurations, which may be used with or without the provision of a dispersible sealant. Various other geometrical configurations, sizes, proportions or shapes may be applied to the seal member within the scope of the invention, to provide sealing contact, encapsulation of dispersible sealant, and/or spring-like bias of interlock elements into contact, in similar fashion to the above described embodiments.

While the invention has been described with reference to preferred and example embodiments, it will be understood by those skilled in the art that a variety of modifications, additions and deletions are within the scope of the invention, as defined by the following claims.

What is claimed is:

1. A sheet piling panel for forming a barrier assembly, the sheet piling panel comprising:
   first and second interlock profiles, the first and second interlock profiles being generally complementary, whereby the first interlock profile of one such sheet piling panel is interengagable with the second interlock profile of another such sheet piling panel by axial sliding engagement, to form an assembly of interlocked sheet piling panels; and
   a resilient sealing member extending along at least a portion of one of the first and second interlock profiles, the resilient sealing member comprising an internal containment area having a dispersible sealant disposed therein, and further comprising at least one passage for dispersing the dispersible sealant from the internal containment area through the at least one passage as the first interlock profile of one sheet piling panel is engaged with the second interlock profile of another such sheet piling panel.

2. The sheet piling panel of claim 1, wherein the first and second interlock profiles comprise a male interlock and a female interlock, and wherein the resilient sealing member extends along at least a portion of the female interlock.

3. The sheet piling panel of claim 2, wherein the resilient sealing member comprises a generally tubular bulb having a generally circular cross-sectional profile surrounding the internal containment area, and wherein the at least one passage for dispersing the dispersible sealant comprises a slit between a free end and a base portion of the resilient sealing member.

4. The sheet piling panel of claim 1, wherein the resilient sealing member further comprises at least one fin extending along its length.

5. The sheet piling panel of claim 1, wherein the dispersible sealant comprises a swellable hydrophilic material.

6. The sheet piling panel of claim 1, wherein at least one of the first and second interlock profiles further comprises a soil incursion reducer at an end thereof to prevent soil from entering the interlock profile as the sheet piling panel is driven into the ground.

7. A sealing member for sheet piling panels, the sealing member comprising:
   a base portion for attachment to an interlock element of the sheet piling panel;
   a generally resilient body projecting outwardly from the base portion;
   a containment area configured to temporarily retain a dispersible sealant; and at least one delivery port for dispersing the dispersible sealant, wherein the delivery port is configured to disperse the sealant from the containment area upon sliding engagement of an interlock profile of a sheet piling panel against the resilient body of the sealing member.

8. The sealing member of claim 7, wherein the containment area comprises a hollow generally tubular bulb.

9. The sealing member of claim 8, further comprising a dispersible sealant disposed within the hollow generally tubular bulb.

10. The sealing member of claim 7, wherein the resilient body comprises at least one fin extending along its length.

11. The sealing member of claim 7, wherein the dispersible sealant comprises a swellable hydrophilic material.

12. A barrier assembly comprising:
    a first sheet piling panel comprising a female interlock;
    a second sheet piling panel comprising a male interlock for cooperative axial sliding engagement into the female interlock of the first sheet piling panel when assembled; and
    a resilient sealing member engaged between the female interlock of the first sheet piling panel and the male interlock of the second sheet piling panel, the resilient sealing member comprising an internal chamber for containing a dispersible sealant disposed therein prior to engagement of the male interlock of the second sheet piling panel into the female interlock of the first sheet piling panel, and the resilient sealing member further comprising at least one passage for dispersing the dispersible sealant from the internal chamber through the at least one passage as the male interlock of the second sheet piling panel slides into engagement with the female interlock of the first sheet piling panel.

13. The barrier assembly of claim 12, wherein the resilient sealing member comprises a hollow generally tubular bulb.

14. The barrier assembly of claim 13, further comprising a dispersible sealant disposed within the hollow generally tubular bulb.

15. The barrier assembly of claim 12, wherein the resilient sealing member comprises at least one flexible sealing fin extending along its length.

16. The barrier assembly of claim 12, wherein the dispersible sealant comprises a swellable hydrophilic material.

17. The barrier assembly of claim 12, wherein the female interlock of the first sheet piling panel further comprises a soil incursion reducer at an end thereof to prevent soil from entering the interlock profile as the sheet piling panel is driven into the ground.

18. A method of sealing against fluid transmission through an interlock joint between first and second sheet piling panels of a barrier assembly, the method comprising:
attaching a resilient sealing member to one of a female interlock of the first sheet piling panel and a male interlock of the second sheet piling panel, wherein the resilient sealing member contains a dispersible sealant therein prior to engagement of the first and second sheet piling panels; and
engaging the resilient sealing member between the female interlock of the first sheet piling panel and the male interlock of the second sheet piling panel, wherein said engagement causes dispersal of the dispersible sealant through at least one passage in the resilient sealing member into a channel formed by the female interlock as the male interlock slides within the female interlock upon engagement of the first and second sheet piling panels.

19. The method of claim 18, wherein the sheet piling panels are installed with the male interlock trailing and the female interlock leading, such that the male interlock of a subsequently installed one of the sheet piling panels engages the female interlock of a previously installed one of the sheet piling panels as the barrier assembly is constructed.

20. The sealing method of claim 18, wherein the dispersible sealant comprises a swellable hydrophilic material, said method further comprising expansion of the dispersible sealant by contact with water after engagement of the first and second sheet piling panels to fill voids between the male and female interlocks.

* * * * *